United States Patent [19]

Sekimoto et al.

[11] Patent Number: 4,696,566
[45] Date of Patent: Sep. 29, 1987

[54] THREE-DIMENSIONAL DRIVING ARRANGEMENT

[75] Inventors: Yoshihiro Sekimoto; Shigeo Terashima, both of Tenri; Kunio Kojima, Nara, all of Japan

[73] Assignee: Sharp Kabushiki Kaisha, Osaka, Japan

[21] Appl. No.: 697,465

[22] Filed: Feb. 1, 1985

[30] Foreign Application Priority Data

| Feb. 8, 1984 [JP] | Japan | 59-22493 |
| Feb. 8, 1984 [JP] | Japan | 59-22494 |
| Apr. 13, 1984 [JP] | Japan | 59-75544 |
| Apr. 13, 1984 [JP] | Japan | 59-75545 |

[51] Int. Cl.$^4$ .............................................. G11B 7/12
[52] U.S. Cl. .................................. 350/255; 369/44; 369/112
[58] Field of Search ............... 369/44, 45, 46, 112; 350/6.3, 252, 255; 250/201 DF

[56] References Cited

U.S. PATENT DOCUMENTS

| 4,482,986 | 11/1984 | Noda et al. | 369/44 |
| 4,555,780 | 11/1985 | Koide | 369/45 |
| 4,574,369 | 3/1986 | Koide et al. | 369/44 |

FOREIGN PATENT DOCUMENTS 55-42369  3/1980  Japan .................................. 369/44

Primary Examiner—Donald McElheny, Jr.
Attorney, Agent, or Firm—Birch, Stewart, Kolasch & Birch

[57] ABSTRACT

A three-dimensional driving arrangement of an objective lens or the like, which is so arranged that coils for focusing control, tracking control and tangential control in three directions are disposed in one magnetic gap for compact size, while the coils for the tracking control and tangential control are each formed to have a V-shaped cross section, with going passage arms of the coils being disposed in the magnetic gap, but returning passage arms of them being disposed outside the magnetic gap through four slit-like notches formed in a yoke, thus making it possible to drive the objective lens independently in three directions.

1 Claim, 11 Drawing Figures

THREE-DIMENSIONAL DRIVING ARRANGEMENT

BACKGROUND OF THE INVENTION

The present invention generally relates to a driving system and more particularly, to a three-dimensional driving arrangement for an objective lens in an optical disc player or the like.

Commonly, a reproducing apparatus for optical discs is so arranged that light radiated from a light source is converged or collected by an objective lens onto a row of pits on a recording disc, while a light spot is caused to accurately follow the row of pits, and thus, light reflected from the surface of the disc is received by an optical detector so as to read information through conversion of variation in light amount into electrical signals for reproduction.

By way of example, in a video disc player, it is required to effect control in a focusing direction so as to collect light on the pit row of the disc in a very small spot, and control in a tracking direction for causing the spot to accurately follow the pit row, and also, control in a tangential direction for removal of variation in time axis due to uneven rotation of the disc. For effecting controls in the three directions as described above, there may be conceived methods as follows.

(i) a method in which the focusing control is effected by driving an objective lens in a direction perpendicular to the disc surface, while two galvano-mirrors disposed in a light path between a light source and the objective lens are rotated to effect the tracking control and the tangential control, (ii) a method in which an objective lens is two-dimensionally driven for effecting both of the focusing and tracking controls, while the tangential control is effected by one galvano-mirror, and (iii) a method in which an objective lens is driven three-dimensionally.

However, the methods which employ the galvanomirrors as in the above items (i) and (ii) have such disadvantages that, since the optical axis of the objective lens is inclined, the open aperture diameter of the lens must be increased, and that owing to the provision of the respectively independent control mechanisms, the apparatus tends to be large in size.

Accordingly, the method in the above item (iii) for driving the objective lens three-dimensionally will be further considered. In the first, there may be conceived a practice in which the objective lens is driven in the respective directions by independent driving mechanisms including magnetic circuits and coils, but this undesirably results in a large size of the resultant driving arrangement on the whole. Another practice which may be considered is a method in which three coils for the focusing control, tracking control and tangential control are provided in one magnetic gap for driving of the objective lens in three directions. In the above case, the driving arrangement may be reduced in size since only one magnetic circuit is sufficient for the purpose, but the way of winding of the coils is brought into question for effecting independent driving.

In connection with the above, there has conventionally been proposed, for example, in Japanese Patent Laid-Open Publication Tokkaisho No. 58-19743, one example of a three-dimensional driving arrangement in which three coils for the focusing control, tracking control and tangential control are disposed in one magnetic gap. In the actual construction, the known arrangement includes one focusing control coil, and four tracking and tangential control coils in total provided in one magnetic gap, and by feeding predetermined electric current to the focusing control coil, the objective lens support member is displaced in a Z direction. Meanwhile, with respect to the driving in the tracking direction, for example, if directions of currents for coils $3a$ to $3d$ are assumed to be as shown in FIG. 1, with magnitudes of the currents for the coils $3a$ and $3b$ and $3c$ and $3d$ being set to be equal to each other, forces fx are produced in the tracking direction. In this case, components fy of the forces in the tangential direction are offset to each other to render the resultant force to be zero. The driving in the tangential direction may also be effected based on the same principle as above. However, this practice has such disadvantages that the resultant force is not reduced to zero if there is any unbalancing of magnetic flux, or that independent driving can not be effected if it is required to drive in both directions simultaneously.

SUMMARY OF THE INVENTION

Accordingly, an essential object of the present invention is to provide an improved three-dimensional driving arrangement for an objective lens, which is so arranged that coils for focusing control, tracking control and tangential control in three directions are disposed in one magnetic gap for a compact size, while the coils for the tracking control and tangential control are each formed to have a V-shaped cross section, with going passage arms thereof being disposed in the magnetic gap, but returning passage arms thereof being disposed outside the magnetic gap through four slit-like notches formed in a yoke, thus making it possible to drive the objective lens independently in three directions.

Another important object of the present invention is to provide a three-dimensional driving arrangement of the above described type, in which a pair of upper and lower elastic members are attached to an objective lens support member provided with the objective lens at its central portion, to prevent said support member from inclining, while the elastic members reduced in thickness for facilitation in vertical movements are each formed generally into a shape of a figure eight in the top plan view, having constricted portions in respective directions so as to be readily movable also horizontally in two directions for damping action in all directions through utilization of deflection in the elastic members.

A further object of the present invention is to provide a three-dimensional driving arrangement of the above described type in which an objective lens support member is supported by elastic members each formed into a rectangular frame-like shape for damping action in three directions through utilization of deflection of the elastic members as far as possible so as to provide a three-dimensional driving arrangement which can be readily operated.

Still another object of the present invention is to provide a three-dimensional driving arrangement of the above described type, in which the objective lens is provided at the central upper portion of the objective lens support member, while a balancer member having an opening for light transmission, etc. is provided at the lower portion of the support member so as to lower a center of gravity of the movable part approximately to the center of the objective lens support member, and by supporting the support member through a pair of elastic members, driving is effected generally at the position of the center of gravity by a driving mechanism including a magnetic circuit and coils so as to provide stable characteristics.

In accomplishing these and other objects, according to one preferred embodiment of the present invention, there is provided a three-dimensional driving arrangement for an objective lens, which includes an objective lens support member having an objective lens provided at a central portion thereof, a driving means for driving the objective lens support member vertically and horizontally in three directions, and a pair of elastic members respectively provided at upper and lower portions of the objective lens support member for movably supporting said support member and for effecting damping action in the respective vertical and horizontal directions. The elastic members are each reduced in thickness in the vertical direction and formed, in a top plan view thereof, generally into a shape of a figure eight provided with constricted portions respectively in the two horizontal directions.

By the constructions according to the present invention as described above and other constructions to be described hereinafter, an improved driving arrangement has been advantageously presented.

BRIEF DESCRIPTION OF THE DRAWINGS

These and other objects and features of the present invention will become apparent from the following description taken in conjunction with the preferred embodiment thereof with reference to the accompanying drawings, in which.

DETAILED DESCRIPTION OF THE INVENTION

Figure 1:
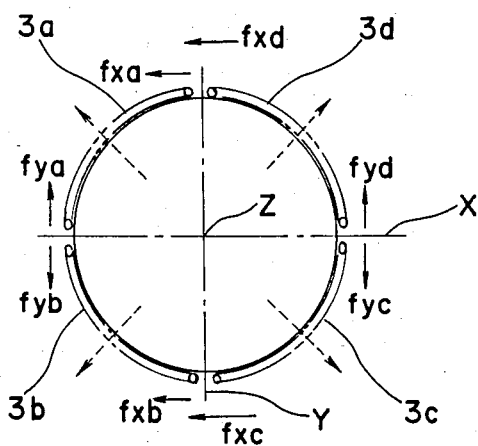
FIG. 1 is a schematic diagram for explaining functions of a conventional three-dimensional driving arrangement (already referred to)

Before the description of the present invention proceeds, it is to be noted that like parts are designated by like reference numerals throughout the accompanying drawings.

Referring now to the drawings, there is shown in FIGS. 2 through 6, a three-dimensional driving arrangement D1 for an objective lens or the like according to one preferred embodiment of the present invention. The driving arrangement D1 generally includes an objective lens support member 11 having an objective lens 12 provided at a central portion thereof and adapted to be driven vertically and horizontally in three directions, and a pair of elastic members 26 respectively provided at upper and lower portions of the objective lens support member 11 for supporting said member 11 and for effecting damping action in the respective vertical and horizontal directions.

The objective lens 12 is inserted into a central bore 11b of the cylindrical objective lens support member 11 from its upper portion so as to be secured therein. Meanwhile, the objective lens support member 11 is provided, at its upper portion, with a flange portion 13 formed with four slits 14a, 14b, 14c and 14d, in which four tracking coils 15a, 15b, 15c and 15d and another four tangential coils 16a, 16b, 16c and 16d each formed to have a V-shaped cross section, are respectively inserted in a manner to be described later, with an annular or ring-shaped focusing coil 17 being directed around outer peripheral surfaces of the coils referred to above.

Figure 2:
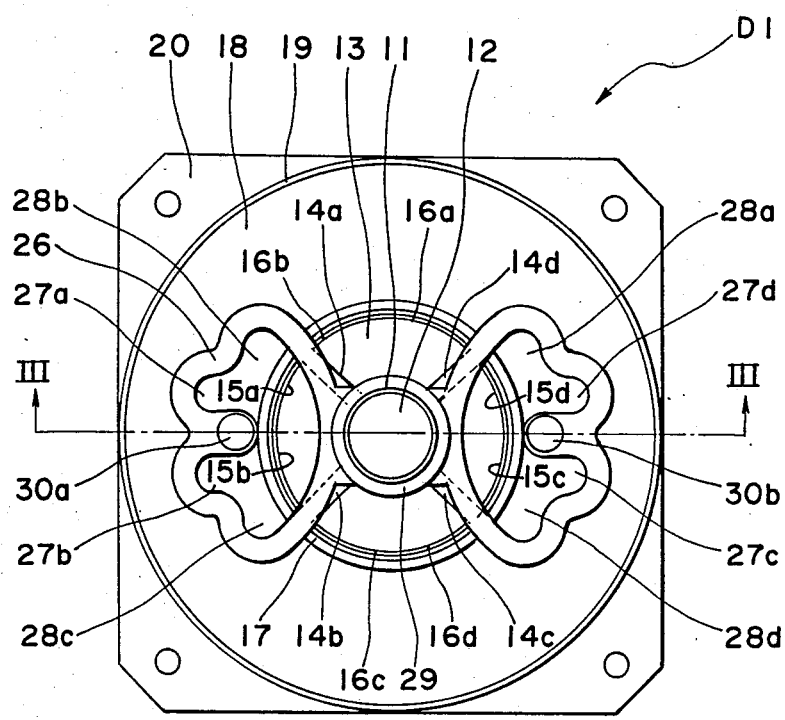
FIG. 2 is a top plan view showing a three-dimensional driving arrangement for an objective lens according to one preferred embodiment of the present invention.
Figure 3:
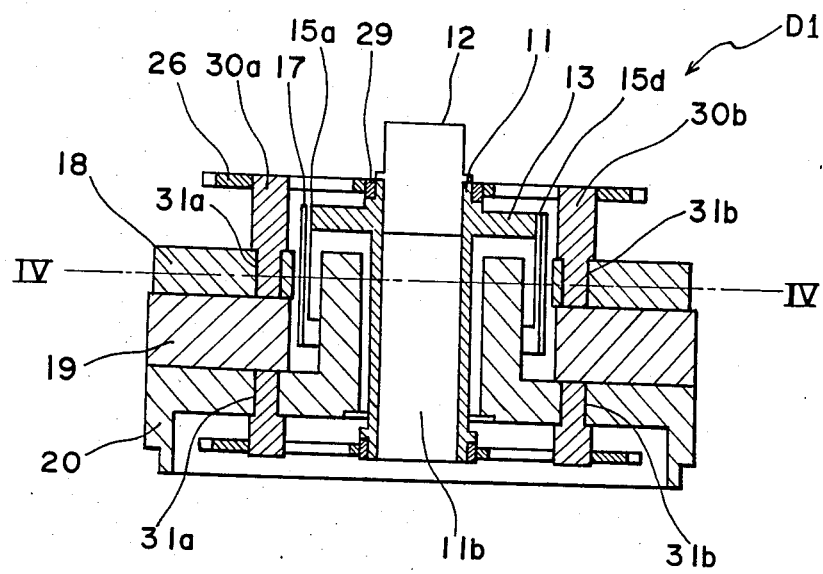
FIG. 3 is a side sectional view taken along the line III—III in FIG. 2.
Figure 4:
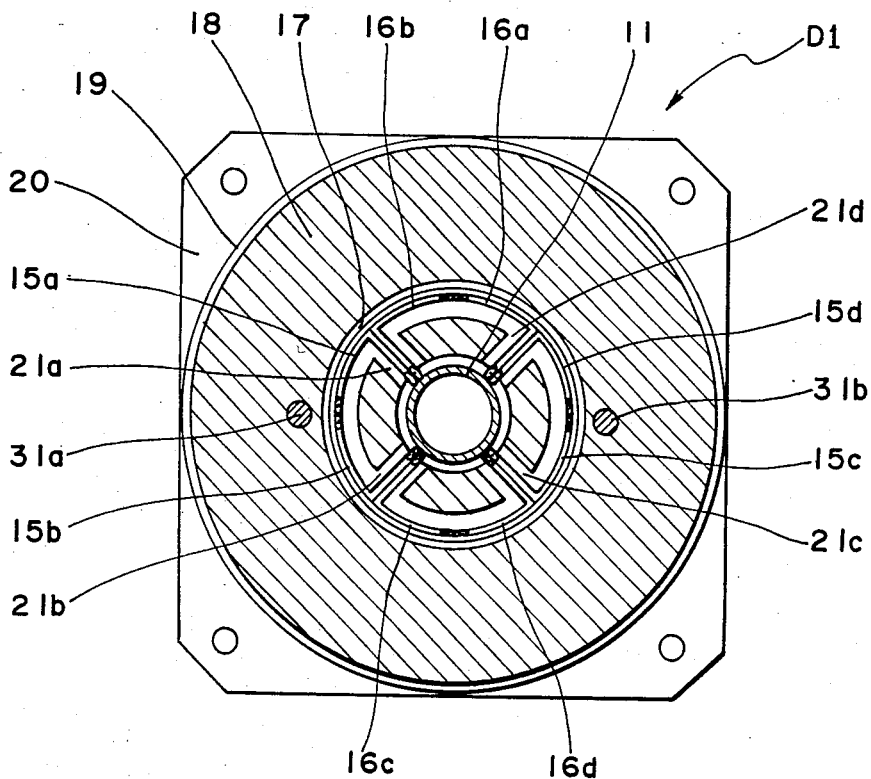
FIG. 4 is a cross section taken along the line IV—IV in FIG. 3.

More specifically, into the respective slits 14a, 14b, 14c and 14d, arms at one side of the neighboring coils 16b and 15a, 15b and 16c, 16d and 15c, and 15d and 16a(i.e., arms, 24a, 24b, 24c and 24d, and 25a, 25b, 25c and 25d) are inserted, while arms at the other side thereof (i.e., arms 22a, 22b, 22c and 22d, and 23a, 23b, 23c and 23d) are disposed around the outer periphery of the flange portion 13 in symmetrical relation with respect to the respective slits 14a, 14b, 14c and 14d so as to be fixed thereat. Thus, neighboring tracking coils 15a and 15b, and 15c and 15d are respectively located between the slits 14a and 14b, and the slits 14c and 14d, while the neighboring tangential coils 16a and 16b, and 16c and 16d are respectively located between the slits 14d and 14a, and the slits 14b and 14c, and therefore, the two tracking coils and the two tangential coils are to be alternately disposed between the respective slits as illustrated in FIG. 2. In the above construction, the arms at one side of the respective coils inserted in the corresponding slits 14a to 14d, i.e., the arms 24a to 24d, and 25a to 25d, are used as returning passage arms, and the other arms thereof disposed on the outer peripheral surface of the flange portion 13, i.e., the arms 22a to 22d and 23a to 23d, are utilized as going passage arms.

On the other hand, a magnetic circuit is constituted by a yoke plate 18, a magnet 19, and a flanged cylindrical yoke 20 which is formed with four slit-like notches 21a, 21b, 21c and 21d. In an air or magnetic gap of the above magnetic circuit, the focusing coil 17 and the going passage arms 22a to 22d and 23a to 23d of the tracking coils 15a to 15d and the tangential coils 16a to 16d are disposed, while the returning passage arms 24a to 24d and 25a to 25d thereof are directed outside the air gap through said notches 21a to 21d. Accordingly, as shown for example, in an enlarged diagram of FIG. 6, when electric currents are fed to the respective coils to direct the magnetic flux outwardly, forces Ftr in the tracking direction and forces Fta in the tangential direction are produced, thus making it possible to effect independent driving in three directions together with the driving in the focusing direction.

Each of the pair of the elastic members 26 made of a resilient material such as rubber or the like is reduced in thickness in a vertical direction so as to be readily movable in the focusing direction, and formed, as observed from above, generally into a shape of a figure eight provided with constricted portions 27a, 27b, 27c and 27d, and 28a, 28b, 28c and 28d adjacent to opposite end portions thereof for facilitation of movements in the tracking direction and tangential direction. The elastic members 26 provided in pairs at the upper and lower portions of the objective lens support member 11 to prevent the optical axis from inclination are each fixed, at central portions 29 thereof, to said support member 11, while pins 30a and 30b provided at opposite ends of the elastic members 26 are received for securing in corresponding openings 31a and 31b formed in the yoke plate 18 or the cylindrical yoke 20. In this embodiment, since the central portions 29 and the pins 30a and 30b and the opposite end portions adjacent thereto of the elastic members 26 are made of a metallic material, with the metallic portions and the elastic material portion thereof being rigidly bonded together through application of a primer treatment, the assembling work of the driving arrangement is markedly facilitated. In the manner as described above, the objective lens support member 11 is movably supported by the pair of elastic members 26, with damping action in the focusing direction, tracking direction and tangential direction being maintained.

Figure 5:
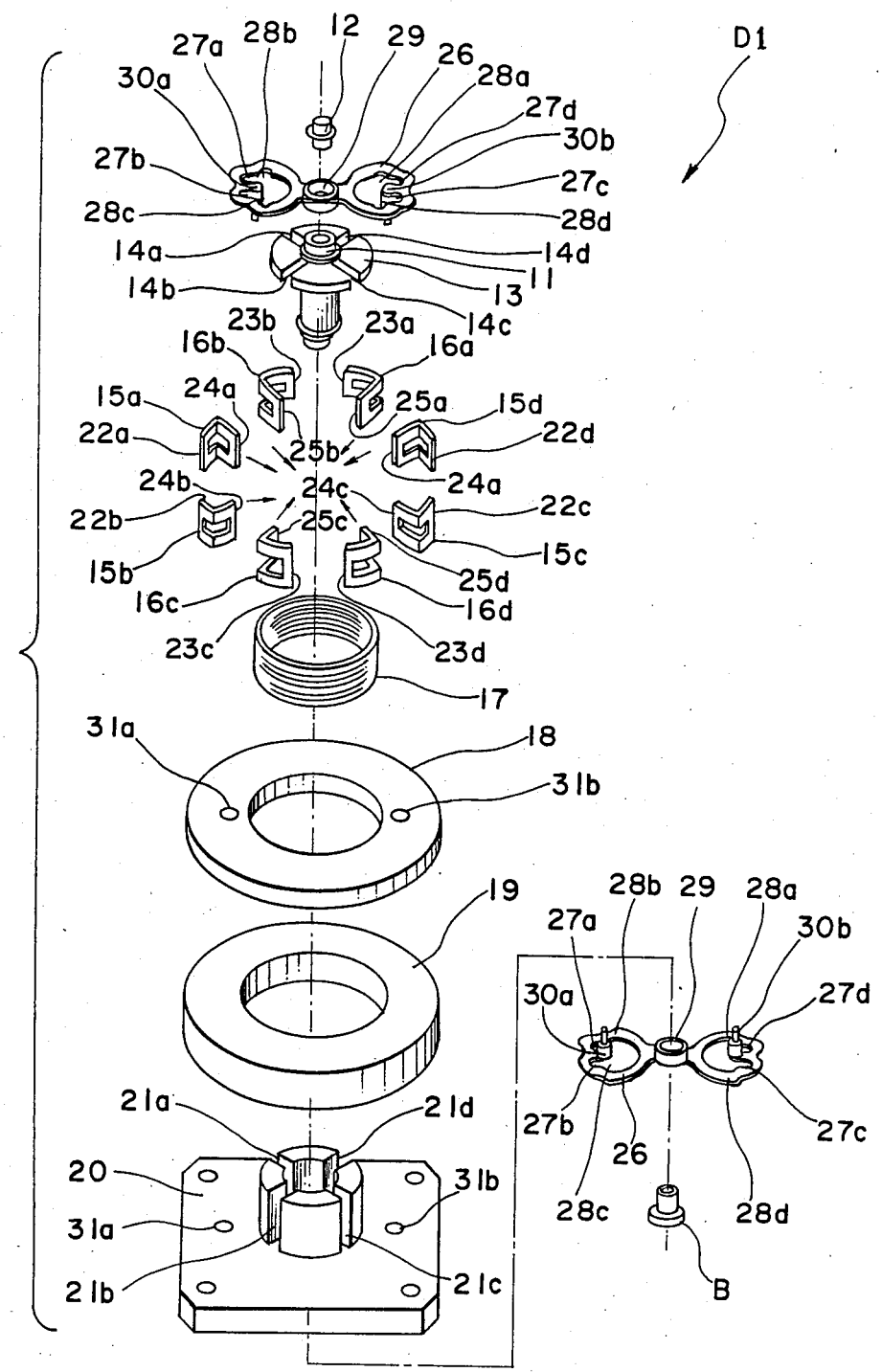
FIG. 5 is an exploded perspective view of the three-dimensional driving arrangement of FIG. 2.
Figure 6:
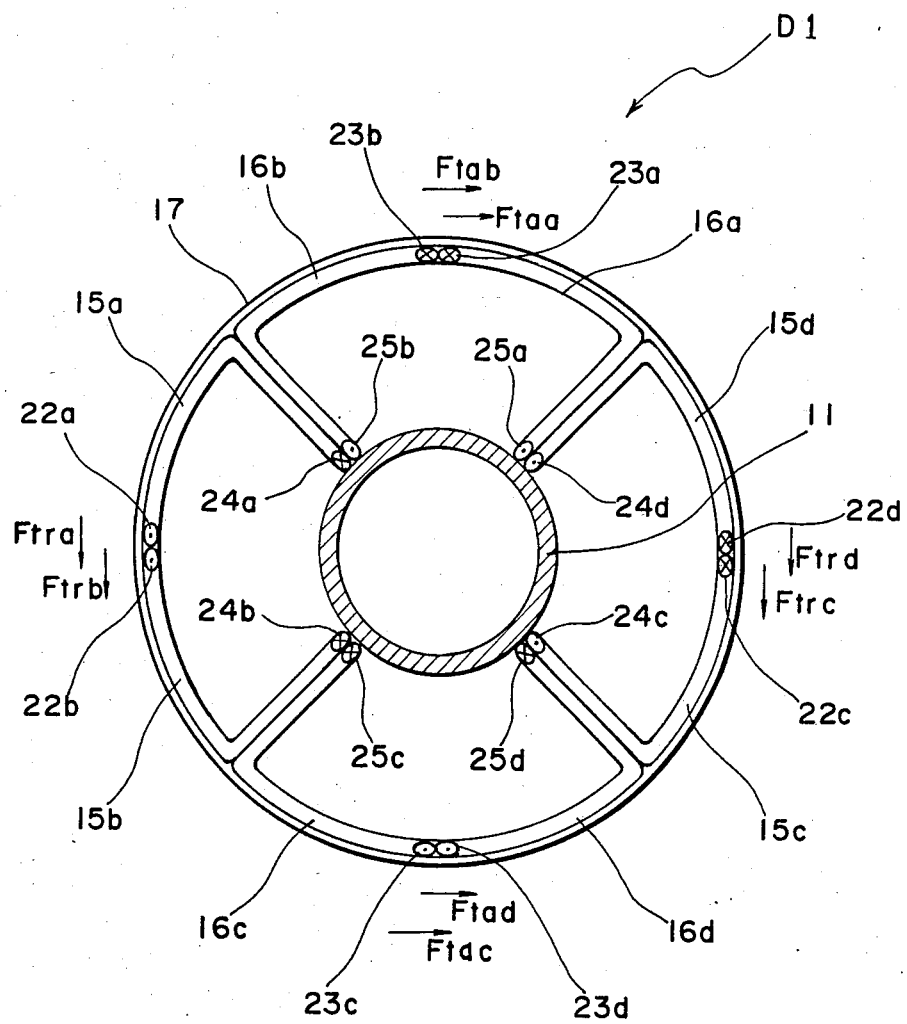
FIG. 6 is a schematic diagram in cross section of a main portion of the driving arrangement of FIG. 2 for explaining driving functions in the tracking direction or tangential direction.

Although the objective lens support member 11 is supported by the pair of upper and lower elastic members 26 as described above for preventing the optical axis from inclination as far as practicable, there is still such a problem that the center of gravity of the moving part is located at a considerably upper portion, since the objective lens 12 heavy in weight is provided at the upper portion of the support member 11, and due to the fact that the forces produced in the coils are located therebelow, the objective lens 12 might be inclined in some cases, in a direction opposite to the direction of the force during driving in the horizontal direction (i.e., tracking direction or tangential direction). In this case, if a balancer member B is attached to the lower portion of the objective lens support member 11 as shown in FIG. 5 so as to lower the center of gravity for driving in the horizontal direction, with the force being caused to act on the center of gravity as far as possible, still more stable characteristics may be achieved.

Figure 7A:
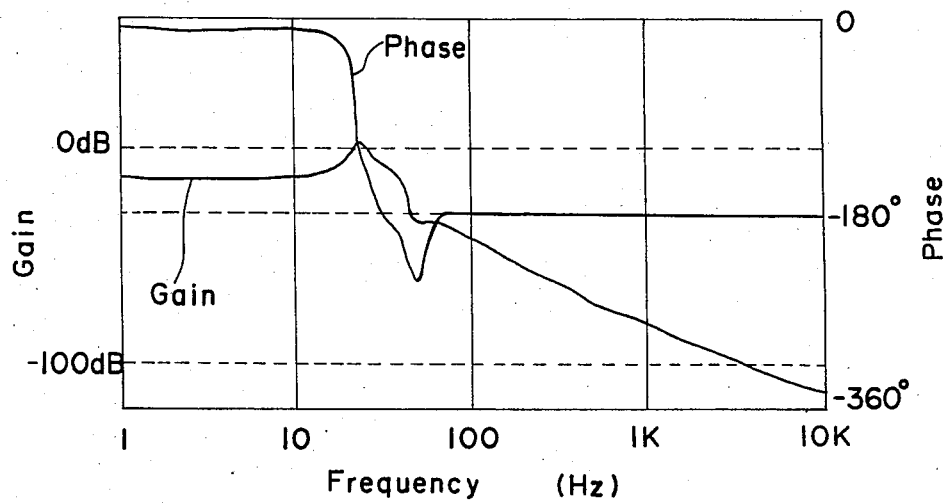
FIGS. 7(a) and 7(b) are characteristic diagrams showing a comparison between a case where a balancer member is not provided at the lower portion of the objective lens support member and another case where the balancer member is provided thereat.
Figure 7B:
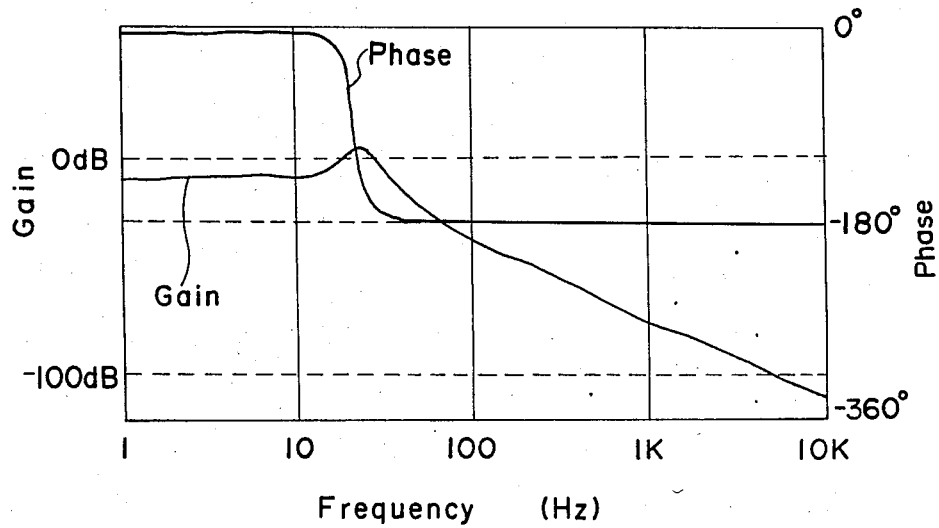

FIG. 7(a) shows a characteristic diagram in the case where no balancer member is attached to the lower portion of the objective lens support member 11, while FIG. 7(b) shows the state when the balancer member B is attached thereto. In the diagram of FIG. 7(a), an abnormal tendency is clearly noticed at several tens Hz, whereas in the diagram of FIG. 7(b) related to the objective lens support member provided with the balancer member B, an improvement is observed in the characteristics.

As is seen from the foregoing description, according to the present invention, an improved three-dimensional driving arrangement of an objective lens compact in size and capable of independently driving the objective lens in three directions may be advantageously presented. Moreover, by the arrangement to apply the force to the center of gravity during driving in the horizontal direction through attachment of the balancer member B, with the movable part being supported by the pair of upper and lower elastic members, still more stable and favorable characteristics have been obtained.

Figure 8:
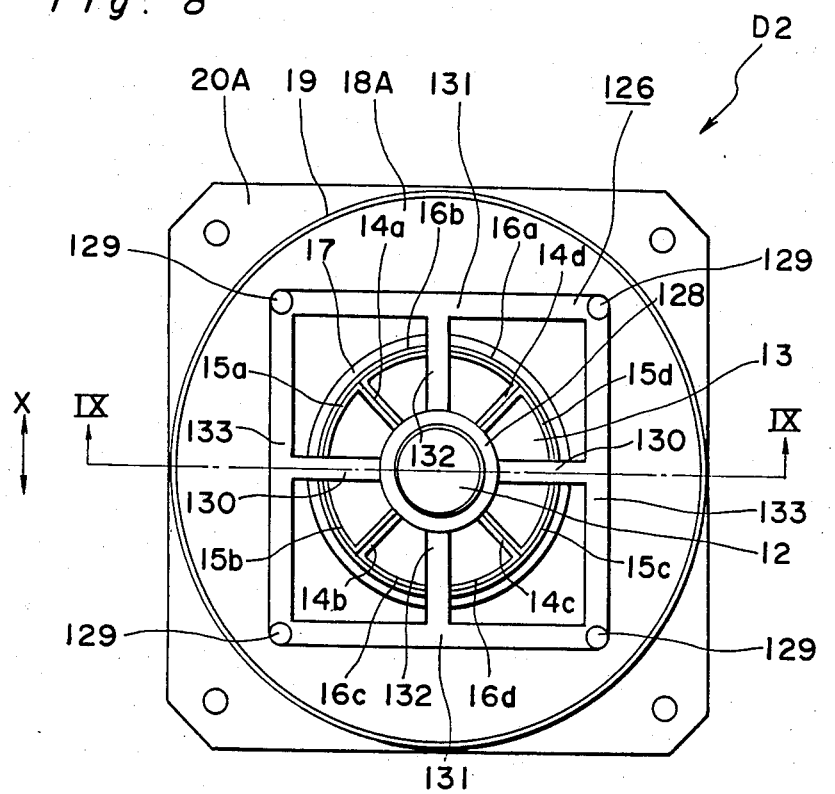
FIG. 8 is a view similar to FIG. 2, which particularly shows a modification thereof.
Figure 9:
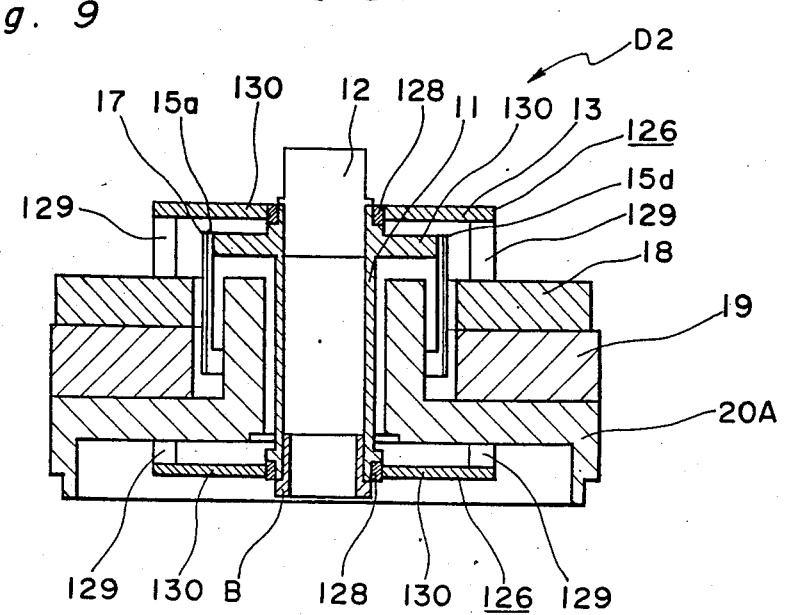
FIG. 9 is a side sectional view taken along the line IX—IX in FIG. 8.
Figure 10:
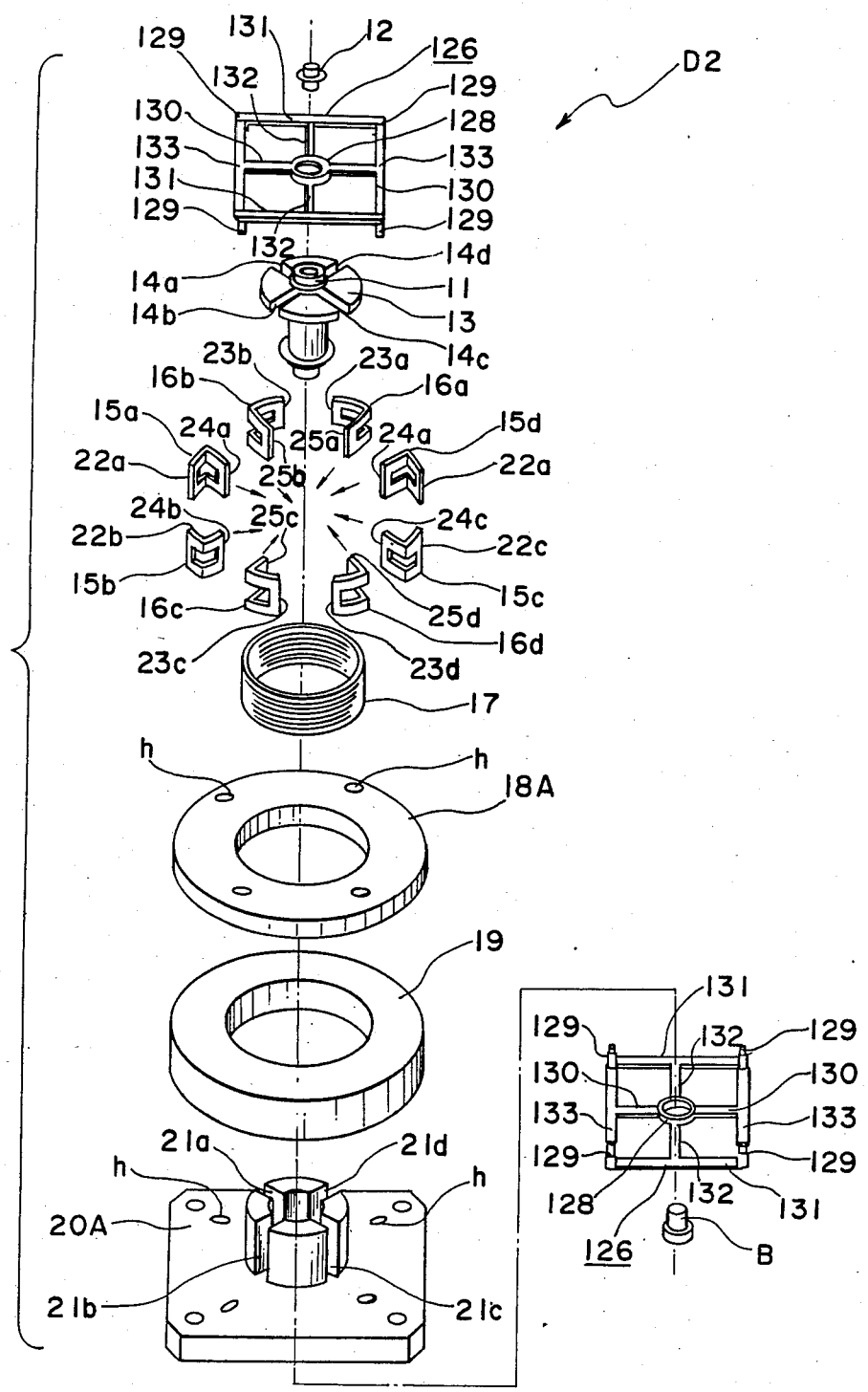
FIG. 10 is an exploded perspective view of the three-dimensional driving arrangement of FIG. 8.

Referring further to FIGS. 8 through 10, there is shown a modification of the objective lens driving arrangement D1 described so far with reference to FIGS. 2 to 6. In the modified driving arrangement D2, the elastic members 26 are replaced by a pair of elastic members 126 each formed into a rectangular frame-like shape having a central boss portion 128 connected to outer frame lateral arms 131 through inner side vertical arms 132, and also to outer frame vertical arms 133 through inner side lateral arms 130. As is most clearly shown in FIG. 8, the inner side lateral arms 130 and the outer frame lateral arms 131 of each elastic member 126 are directed, for example, in the tangential direction Y, while the inner side vertical arms 132 and the outer frame vertical arms 133 thereof are disposed in the tracking direction X. The pair of upper and lower elastic members 126 for stably supporting the objective lens support member 11 are fixed to said support member 11 at the central boss portions 128 thereof, while pins 129 provided at four corner portions of the rectangular elastic members 126 are received for securing in corresponding openings h formed in the yoke plate 18A or cylindrical yoke 20A. Since other constructions of the modified driving arrangement D2 are generally similar to those of the driving arrangement D1 of FIGS. 2 through 6, detailed description thereof is abbreviated here for brevity, with like parts being designated by like reference numerals.

In the modified driving arrangement D2, the elastic members 126 reduced in thickness with a long stroke may be readily deflected in the focusing direction. During driving in the tracking direction X (FIG. 8), the lateral arms 130 and 131 are deflected, while during driving in the tangential direction Y, the vertical arms 132 and 133 are deflected so as to facilitate the driving. Furthermore, even in the case where drivings in the tracking direction and tangential direction are to be simultaneously required, such drivings may be readily effected mainly by the deflection of the outer frame lateral and vertical arms 131 and 133.

As described above, in the modified driving arrangement D2, the objective lens support member 11 is supported by the pair of upper and lower elastic members 126 in the rectangular frame-like configuration, with the damping action being maintained in the focusing, tracking and tangential directions, and since the arms of the elastic members 126 are deflected to correspond to the respective movements during driving in the respective directions, the driving of the objective lens may be readily effected.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. A three-dimensional driving arrangement for an objective lens, which comprises an objective lens support member having an objective lens provided at a central portion thereof, a driving means for driving said objective lens support member vertically and horizontally in three directions, and elastic members respectively provided at upper and lower portions of the objective lens support member for movably supporting said support member and for effecting damping action in the respective vertical and horizontal directions, said elastic members being reduced in thickness in the vertical direction and each formed, in a top plan view thereof, generally into a shape of a figure eight provided with constricted portions respectively in the two horizontal directions.

* * * * *